US011142033B2

(12) United States Patent
Yoshida et al.

(10) Patent No.: US 11,142,033 B2
(45) Date of Patent: Oct. 12, 2021

(54) VEHICLE

(71) Applicant: Yamaha Hatsudoki Kabushiki Kaisha, Shizuoka-ken (JP)

(72) Inventors: Masahiro Yoshida, Shizuoka (JP); Kenta Higashiyama, Shizuoka (JP); Seiji Sawai, Shizuoka (JP); Masahide Shimbori, Shizuoka (JP)

(73) Assignee: YAMAHA HATSUDOKI KABUSHIKI KAISHA, Shizuoka-ken (JP)

( * ) Notice: Subject to any disclaimer, the term of this patent is extended or adjusted under 35 U.S.C. 154(b) by 156 days.

(21) Appl. No.: 16/358,709

(22) Filed: Mar. 20, 2019

(65) Prior Publication Data

US 2019/0291523 A1  Sep. 26, 2019

(30) Foreign Application Priority Data

Mar. 22, 2018 (JP) .............................. JP2018-053929

(51) Int. Cl.
*B60G 7/00* (2006.01)
*B60G 3/20* (2006.01)
(Continued)

(52) U.S. Cl.
CPC ............... *B60G 7/001* (2013.01); *B60G 3/20* (2013.01); *B60G 7/005* (2013.01); *B60K 17/165* (2013.01);
(Continued)

(58) Field of Classification Search
CPC ........ B60K 17/165; B60G 7/001; B60G 3/20; B60G 7/005; B60G 2200/144;
(Continued)

(56) References Cited

U.S. PATENT DOCUMENTS 7,380,805 B1 * 6/2008 Turner ..................... B60G 3/20
280/124.13
9,981,519 B2 * 5/2018 Despres-Nadeau .... B60N 2/688
(Continued)

FOREIGN PATENT DOCUMENTS

CA       3033808 A1 *  2/2018  ............... B62D 3/12
JP       H07-64294 B2    7/1995

OTHER PUBLICATIONS

Machine language translation of JP 7-64294 obtained from espacenet.com on Oct. 21, 2020.*
(Continued)

*Primary Examiner* — Drew J Brown
(74) *Attorney, Agent, or Firm* — Hea Law PLLC

(57) ABSTRACT

A front suspension structure of a vehicle where an appropriate locus of a front wheel when going over undulating ground, an arm span, and an arm length can be secured. Left and right first arms are rotatable about a rotation axis extending forward and obliquely toward a center in a left-right direction in a plan view and passing through two proximal parts. A frame front section has left and right front coupling parts to which proximal parts of front rods of left and right upper arms are coupled respectively. A distance between the left and right front coupling parts is smaller than a width in a left-right direction of a housing of a differential gear.

10 Claims, 8 Drawing Sheets

(51) Int. Cl.
  *B62D 7/20*  (2006.01)
  *B60K 17/16*  (2006.01)

(52) U.S. Cl.
  CPC .......... *B62D 7/20* (2013.01); *B60G 2200/144* (2013.01); *B60G 2200/462* (2013.01); *B60G 2204/14* (2013.01); *B60G 2204/416* (2013.01); *B60G 2300/07* (2013.01)

(58) Field of Classification Search
  CPC ........ B60G 2200/462; B60G 2204/416; B60G 2300/07; B60G 2300/13
  See application file for complete search history.

(56) References Cited

U.S. PATENT DOCUMENTS

| | | | | |
|---|---|---|---|---|
| 10,479,408 B2* | 11/2019 | Upah | ................... | B62D 21/155 |
| 10,525,781 B2* | 1/2020 | Upah | ................... | B60G 7/001 |
| 10,793,181 B2* | 10/2020 | Bennett | ................ | B62D 3/126 |
| 2004/0129489 A1* | 7/2004 | Brasseal | ................ | B62D 1/183 |
| | | | | 180/350 |
| 2014/0124279 A1* | 5/2014 | Schlangen | ........... | B60G 13/003 |
| | | | | 180/68.4 |
| 2016/0332495 A1* | 11/2016 | Franker | ................. | B60G 11/48 |
| 2017/0136874 A1* | 5/2017 | Harris | ................... | B60K 17/34 |
| 2019/0291521 A1* | 9/2019 | Sawai | ................. | B60G 21/055 |

OTHER PUBLICATIONS

Machine language translation of JP H-0764294 obtained from espacenet.,com on May 2, 2021.*

* cited by examiner

VEHICLE

CROSS-REFERENCE TO RELATED APPLICATION

The present application claims priority from Japanese application JP201B-053929 filed on Mar. 22, 2018, the content of which is hereby incorporated, in its entirety, by reference into this application.

FIELD OF THE INVENTION

The present invention relates to a front suspension structure of a vehicle.

BACKGROUND OF THE INVENTION

A double wishbone front suspension has a lower arm and an upper arm. Each arm includes a proximal part thereof coupled to a vehicle frame via a support shaft and rotatable upward and downward about the support shaft. Each arm has a front rod and a rear rod. Each rod has the proximal part coupled to the vehicle frame. In the vehicle disclosed in JP07-64294B, the support shafts of the lower arm and the upper arm extend forward and obliquely upward in a side view of the vehicle. Such an arrangement of the support shafts causes the locus of the front wheal to tilt rearward from vertical when the front wheel goes over undulating ground. That is, when the front wheel goes over undulating ground, the lower arm and the upper arm move rearward and obliquely upward. Such a movement of the arms allows the front wheel to smoothly go over undulating ground, thus achieving a comfortable ride. Also, in JP07-64294B, in a plan view of the vehicle, the support shafts of the lower arms are parallel to the front-rear direction of the vehicle, and the support shafts of the upper arms are arranged obliquely so that the rear parts of the support shafts expand outward in the left-right direction.

As described above, each arm has a front rod and a rear rod, and a support shaft is provided in a proximal part of each rod. Securing a distance (hereinafter referred to as an arm span) between the proximal part of the front rod and the proximal part of the rear rod enables rigidity of the arms. However, in order to increase the arm span in the structure where the support shaft of the arm is arranged obliquely in a side view of the vehicle, as shown in JP07-64294B, it is necessary to shift the position of the proximal part of the front rod forward, raise the position of the proximal part of the front rod, or lower the position of the proximal part of the rear rod (lower the minimum ground clearance). Therefore, it is not easy to expand the arm span in the structure disclosed in JP07-64294B.

Also, a long arm is effective for reducing an alignment change when the front wheels go over undulating ground. However, increasing the spacing between the left and right front wheels increases the size of the vehicle. Therefore, it is not easy to increase the length of the arm. Particularly in the structure where the support shafts are arranged obliquely so that the rear parts of the support shafts expand outward in the left-right direction, as in the upper arm of JP07-64294B, the arms (rear rods) are short.

SUMMARY OF THE INVENTION

An object of this disclosure is to propose a vehicle that can secure an appropriate locus of the front wheel when going over undulating ground and secure a sufficient arm span and a sufficient arm length.

(1) According to an aspect of this disclosure, a vehicle includes: a vehicle frame; left and right front wheels; left and right first arms supporting the left and right front wheels respectively; and a housing accommodating a differential gear arranged between the left and right first arms in a plan view. Each of the left and right first arms has a front rod having a proximal part coupled to the vehicle frame, and a rear rod having a proximal part coupled to the vehicle frame at a position farther rearward than the front rod. Each of the left and right first arms is rotatable about a rotation axis extending forward and obliquely toward a center in a left-right direction in a plan view and passing through the two proximal parts. The vehicle frame has left and right first front coupling parts to which the proximal parts of the front rods of the left and right first arms are coupled respectively. A distance between the left and right first front coupling parts is smaller than a width in a left-right direction of the housing of the differential gear. This vehicle easily secures an appropriate locus of the front wheel when going over undulating ground and easily secures a sufficient arm span and a sufficient length of the first arm.

(2) According to another aspect of this disclosure, a vehicle includes: a vehicle frame; left and right front wheels; left and right first arms supporting the left and right front wheels respectively; and left and right seats. Each of the left and right first arms has a front rod having a proximal part coupled to the vehicle frame, and a rear rod having a proximal part coupled to the vehicle frame at a position farther rearward than the front rod. Each of the left and right first arms is rotatable about a rotation axis extending forward and obliquely toward a center in a left-right direction in a plan view and passing through the two proximal parts. The vehicle frame has left and right first front coupling parts to which the proximal parts of the front rods of the left and right first arms are coupled respectively. The left and right, first front coupling parts are located between the left and right seats in a front view of the vehicle. This vehicle easily secures an appropriate locus of the front wheel when going over undulating ground and easily secures a sufficient arm span and a sufficient length of the first arm.

(3) In the vehicle of (1) or (2), the vehicle frame may have left and right vertical extension parts located in a front part of the vehicle frame and extending in an up-down direction. The left and right first front coupling parts may be located more closely to a center of the vehicle body in a left-right direction than the left and right vertical extension parts. This structure easily optimises the tilt of the rotation axis of the first arm. This structure also secures the length of the first arm easily.

(4) In the vehicle of (1) or (2), the vehicle frame may have left and right first rear coupling parts to which the proximal parts of the rear rods of the left and right first arms are connected respectively. A distance from the first front coupling part to a point of intersection of the rotation axes of the left and right first arms in a plan view of the vehicle may be the same as, or smaller than, a distance from the first rear coupling part to the first front coupling part in a plan view of the vehicle. This structure easily optimizes the tilt of the rotation axis of the first arm. This structure also secures the length of the first arm easily.

(5) The vehicle of (1) or (2) may further include an engine. The distance between the left and right first front coupling parts may be smaller than a width of the engine in a left-right direction.

(6) In the vehicle of (1) or (2), the vehicle frame may have a vertical extension part located in a front part of the vehicle frame and extending in an up-down direction. The proximal parts of the front rods of the left and right first arms may be located farther forward than the vertical extension part in a side view of the vehicle. This structure easily reduces the distance between the proximal parts of the left and right front rods because the proximal parts of the left and right first arms are located farther forward than the vertical extension part of the vehicle frame. Thus, it is easy to optimize the tilt of the rotation axis of the first arm and secure the length of the first arm.

(7) In the vehicle of (1) or (2), each of the left and right first front coupling parts may be a ball joint. This structure easily reduces the distance between the left and right front coupling parts. Thus, it is easy to optimize the tilt of the rotation axis of the first arm and secure the length of the first arm.

(8) In the vehicle of (7), the ball joint may include a ball and a rod supporting the ball. The rod may be tilted from the rotation axis. Thus, interference of the front ends of the rods of the left and right ball joints can be prevented.

(9) In the vehicle of (1) or (2), the left and right first front coupling parts may have a rod protruding from the vehicle frame. A coupling member may be attached to at least one of the rods of the left and right first front coupling parts to couple an end of the at least one rod to another part. Thus, the strength of support of the first front coupling part can be increased.

(10) In the vehicle of (9), the ends of the rods of the left and right first front coupling parts may be coupled to each other by the coupling member. Thus, the strength of support of the first front coupling part can be increased by a simple structure.

(11) In the vehicle of (1) or (2), the rotation axis may extend forward and obliquely upward in a side view of the vehicle. Thus, the locus of the front wheel when going over undulating ground is easily optimized.

(12) In the vehicle of (11), θ1+θ2 may be 10 degrees or greater and 30 degrees or smaller, where θ1 is an angle between the rotation axis and a straight line along a front-rear direction in a plan view of the vehicle and θ2 is an angle between the rotation axis and a straight line along a front-rear direction in a side view of the vehicle. Thus, the angles θ1, θ2 are easily optimized.

(13) In the vehicle of (11), an angle θ1 may be greater than an angle θ2, where θ1 is an angle between the rotation axis and a straight line along a front-rear direction of the vehicle in a plan view of the vehicle and θ2 is an angle between the rotation axis and a straight line along a front-rear direction in a side view of the vehicle. Thus, the angles θ1, θ2 are easily optimized.

(14) The vehicle of (1) or (2) may further include left and right second arms supporting the left and right front wheels respectively and located above or below the first arm. Each of the left and right second arms may have a front rod having a proximal part coupled to the vehicle frame, and a rear rod having a proximal part coupled to the vehicle frame at a position farther rearward than the front rod. Each of the left and right second arms may be rotatable about a rotation axis extending forward and obliquely toward a center in a left-right direction as viewed in a plan view and passing through the proximal part.

(15) The vehicle of (1) may further include left and right second arms supporting the left and right front wheels respectively and located above or below the first arm. Each of the left and right second arms may have a front rod having a proximal part coupled to the vehicle frame, and a rear rod having a proximal part coupled to the vehicle frame at a position farther rearward than the front rod. Each of the left and right second arms may be rotatable about a rotation axis extending forward and obliquely toward a center in a left-right direction in a plan view and passing through the proximal part. The vehicle frame may have loft and right second front coupling parts to which the proximal parts of the front rods of the left and right second arms are connected respectively. A distance between the left and right second front coupling parts may be smaller than the width in the left-right direction of the housing of the differential gear.

(16) The vehicle of (1) or (2) may have a tie rod for steering the left and right front wheels. An angle that is formed on the front side of the tie rod and between the rotation axis and the tie rod in a plan view of the vehicle may be 90 degrees or greater. Thus, for example, when a braking force acts on the front wheel or when the front wheel goes over undulating ground, the front wheel can be easily displaced in a toe-out direction.

(17) In the vehicle of (1), the vehicle frame may have left and right first rear coupling parts to which the proximal parts of the rear rods of the left and right first arms are connected respectively. A distance between the left and right first rear coupling parts may be larger than the width in the left-right direction of the housing of the differential gear. Thus, the tilt of the rotation axis of the first arm is easily optimized.

(18) In the vehicle of (17), the left and right first front coupling parts may be located to the front of the housing of the differential gear in a plan view. The left and right first rear coupling parts may be located farther rearward than the housing of the differential gear in a plan view. Thus, the width in the front-rear direction of the first arm is increased and therefore rigidity of the first arm is attained.

(19) In the vehicle of (1), the vehicle frame may have left and right first rear coupling parts to which the proximal parts of the rear rods of the left and right first arms are connected respectively. A distance between the left and right first rear coupling parts may be smaller than the width in the left-right direction of the housing of the differential gear. Thus, the length of the first arm is secured even more easily.

BRIEF DESCRIPTION OF THE DRAWINGS

The present invention is illustrated by way of example and not limited in the figures of the accompanying drawings in which like references indicate similar elements.

FIG. 8A shows a structure where the angle between the tie rod and the rotation axis of the arm is smaller than 90 degrees. FIG. 8B shows a structure where the angle between the tie rod and the rotation axis of the arm is greater than 90 degrees.

DETAILED DESCRIPTION OF THE INVENTION

Figure 1:
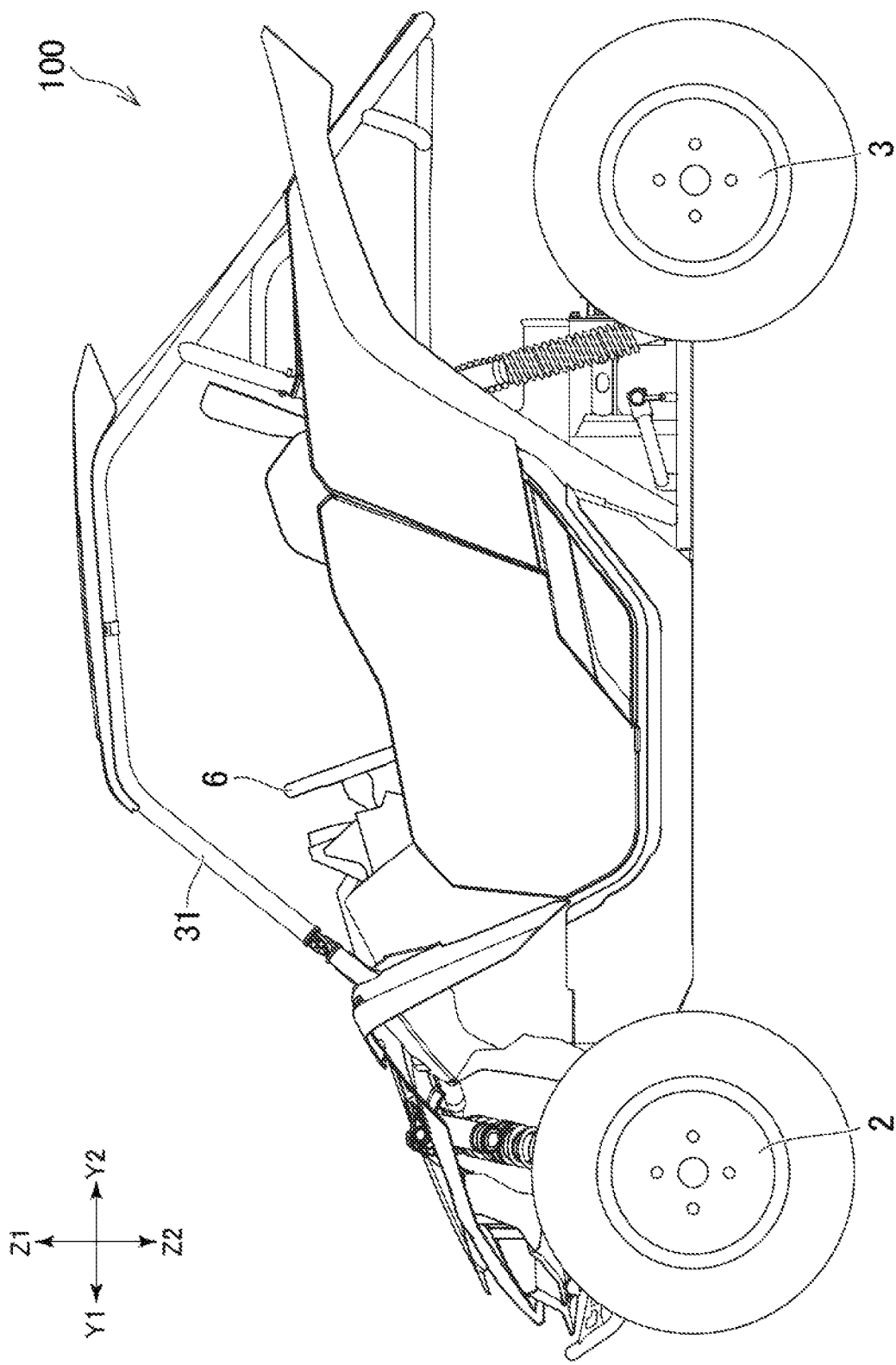
FIG. 1 is a side view showing an example of a vehicle proposed in this disclosure.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises", "comprising", "includes", and/or "including", when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of technologies are disclosed. Each of these has individual benefit and each can also be used in conjunction with one or more, or in some cases all, of the other disclosed technologies. Accordingly, for the sake of clarity, this description will refrain from repeating every possible combination of the individual technologies in an unnecessary fashion. Nevertheless, the specification and claims should be read with the understanding that such combinations are entirely within the scope of the invention and the claims. All identically numbered reference characters correspond to each other so that a duplicative description of each reference character in the drawings may be omitted.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Hereinafter, an example of a vehicle proposed in this disclosure will be described. In FIGS. 1 to 7, directions indicated by Y1 and Y2 are referred to as forward and rearward respectively. Directions indicated by Z1 and Z2 are referred to as above and below respectively. Directions indicated by X1 and X2 are referred to as to right and left respectively. A direction X1-X2 is referred to as a direction of vehicle width or a left-right direction.

In this specification, a vehicle 100 shown in FIG. 1 and other drawings is described as an example of the vehicle. The vehicle 100 is a vehicle called an all-terrain vehicle (ATV), side-by-side vehicle, utility vehicle, recreational off-highway vehicle or the like, which is used relatively frequently on uneven ground.

Overall Outline

The vehicle 100 has left and right front wheels (or wheel) 2 and left and right rear wheels (or wheel) 3. The vehicle 100 also has left and right seats 4 (see FIG. 2). One of the seats 4, which is the left seat 4 in the exampled vehicle 100, is a driver seat where a driver sits. A steering wheel 6 (see FIG. 1) is disposed in front of the driver seat 4. The number of the seats 4 is not limited to two and may be, for example, four. That is, the vehicle 200 may have rear seats arranged to the rear of the seats 4. Also, the number of the seats 4 may be one. That is, the vehicle 100 may have a seat arranged at the center in the direction of the vehicle width (left-right direction). In this case, the seat may be a type which the driver sits astride.

Figure 2:
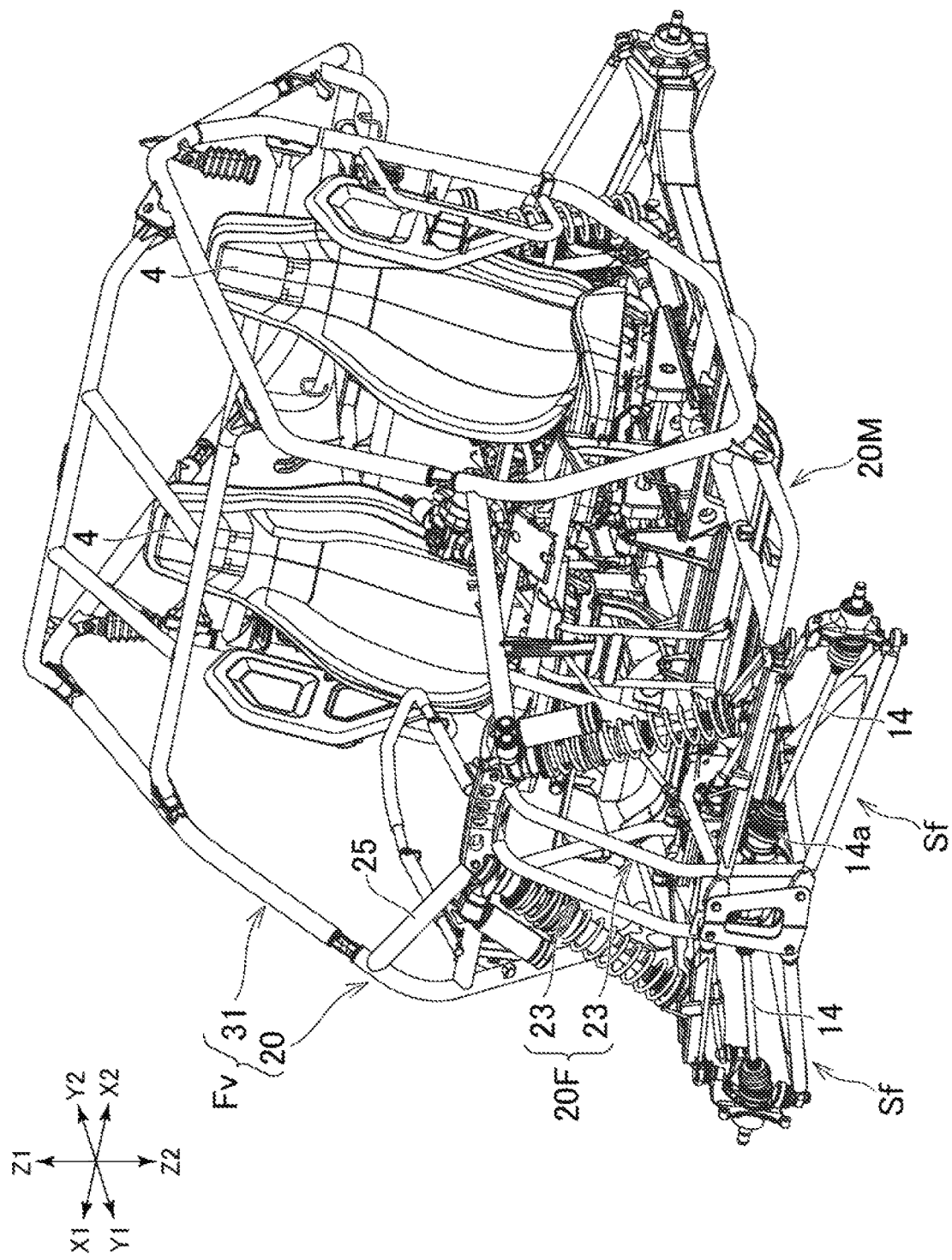
FIG. 2 is a perspective view of a vehicle frame and a front suspension.

As shown in FIG. 2, the vehicle 100 has a vehicle frame Fv. The vehicle frame Fv has a body frame 20 which supports the seat 4, an engine 7 (see FIG. 3) and a transmission or the like. In the exampled vehicle 100, the vehicle frame Fv has a cage 31 covering the seat 4. The body frame 20 and the cage 31 are made up of a plurality of pipes and coupled in the up-down direction. The vehicle frame Fv may not necessarily have to have the cage 31.

Figure 3:
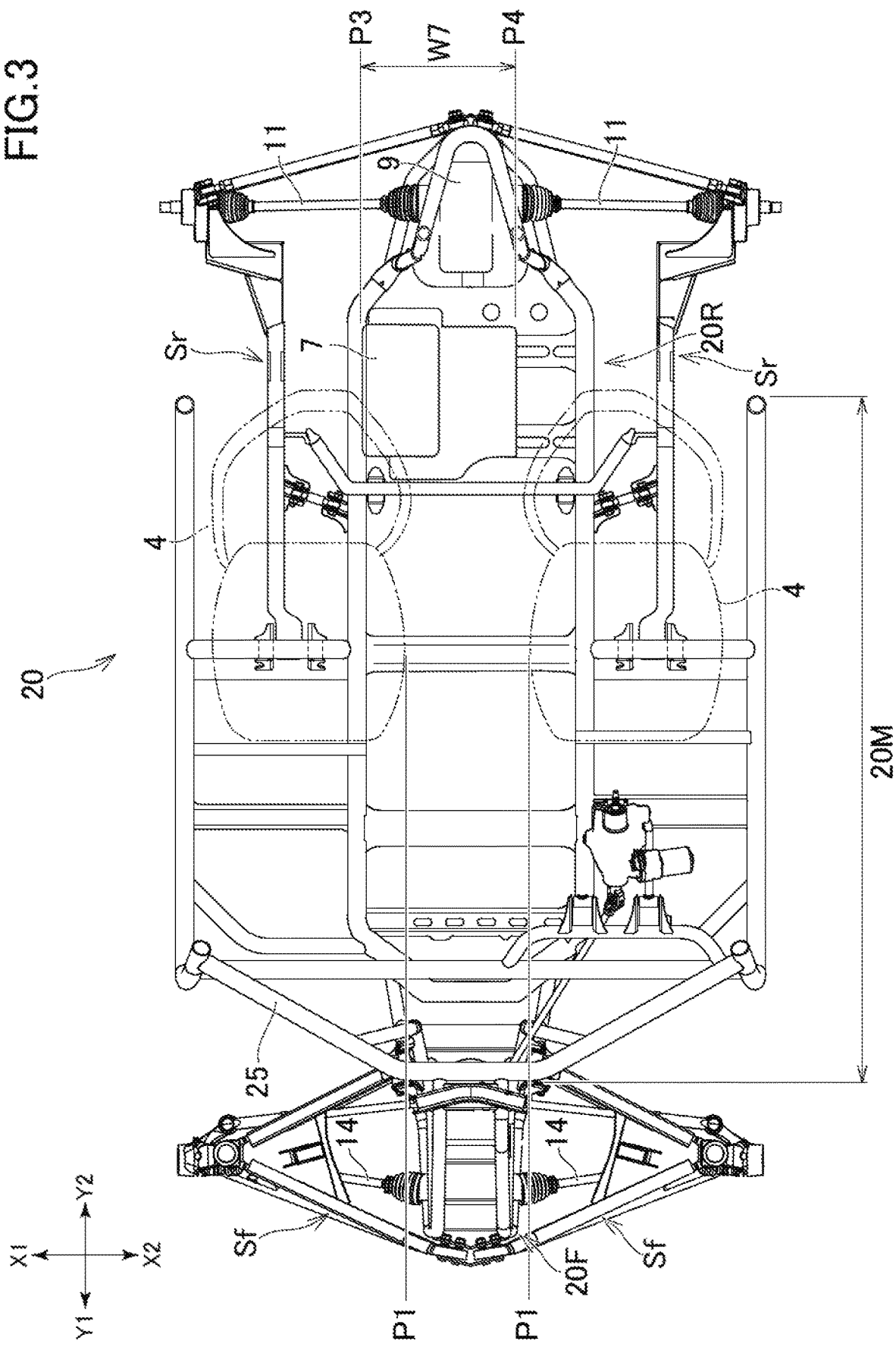
FIG. 3 is a plan view of the vehicle frame and the front suspension.

As shown in FIG. 3, the body frame 20 has a frame middle section 20M supporting the seat 4, and a frame rear section 20R extending rearward from the frame middle section 20M. In the exampled vehicle 100, the engine 7 is arranged farther rearward than the seat 4 and supported on the frame rear section 20R. The vehicle 200 is a four-wheel drive vehicle, and thus the power of the engine 7 can be transmitted to the rear wheel 3 and the front wheel 2. The transmission of the power from the engine 7 to the rear wheel 3 is carried out via a propeller shaft (not illustrated) extending rearward from the transmission (not illustrated) connected to the engine 7, a gear box 9 arranged between the left and right rear wheels 3 and connected to the propeller shaft and accommodating a final reduction gear mechanism, and a drive shaft 11 extending to the right and to the left from the gear box 9. The final reduction gear mechanism accommodated in the gear box 9 may be a mechanism which rotates the left and right drive shafts 11 at the same speed, or a differential gear which allows the difference between the rotational speeds of the left and right drive shafts 11. The transmission of the power from the engine 7 to the front wheel 2 is carried out via a propeller shaft (not illustrated) extending forward from the transmission, a front differential gear 13 (see FIG. 6) arranged between the left and right front wheels 2 and connected to the propeller shaft, and left and right drive shafts 14 extending outward in the left-right direction from the front differential gear 13. An end of the drive shaft 14 (an end close to the center C1 of the vehicle body in the left-right direction) is connected to a rotation shaft in the front differential gear 13 via a joint part 14a. (The rotation shaft is a shaft rotating together with a side gear (not illustrated) of the differential gear 13.) The drive shaft 14 is allowed to swing up and down about the differential gear 13. The outer end in the left-right direction of the drive shaft 14 is coupled to an axle 2a of the front wheel 2.

Figure 6:
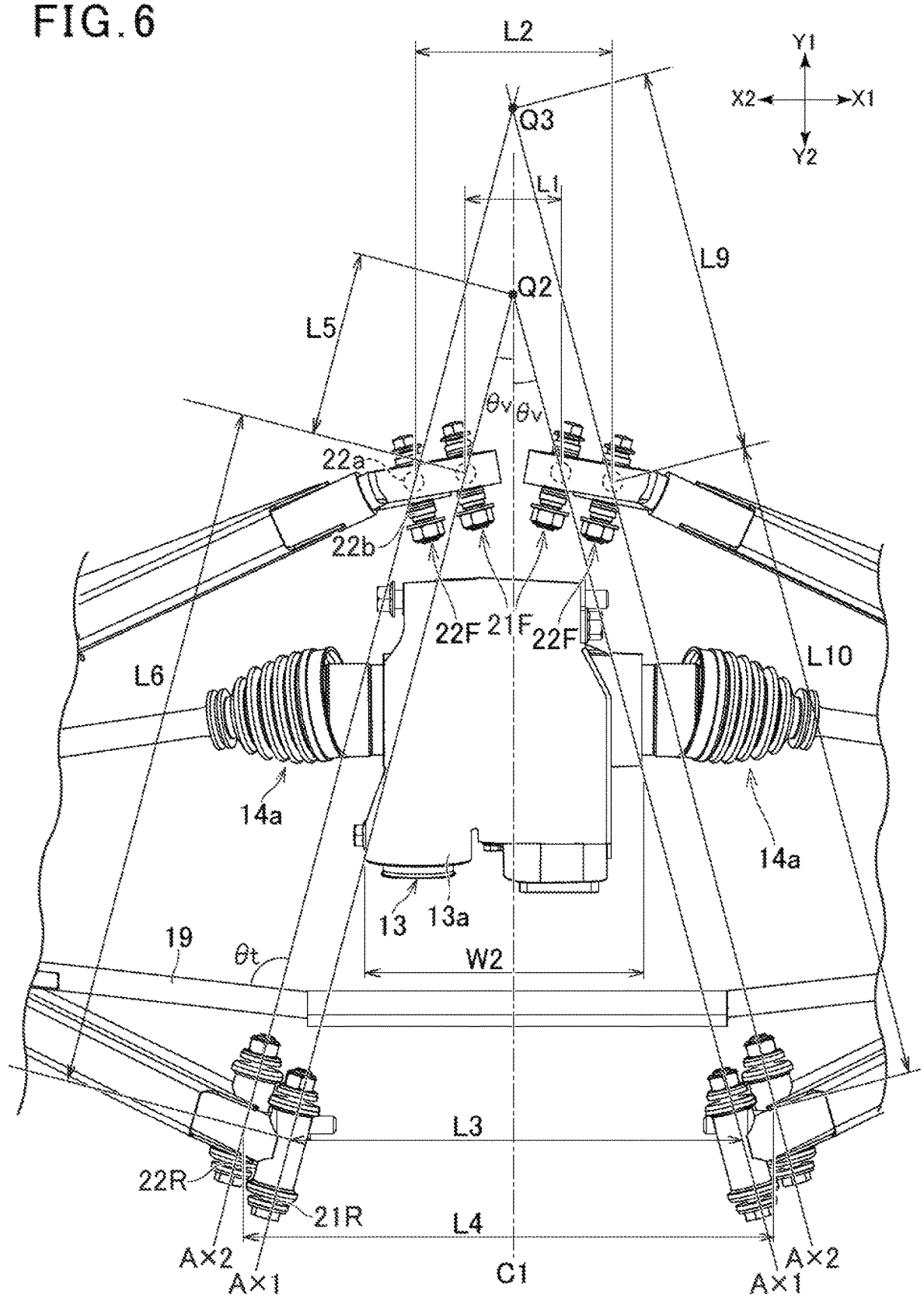
FIG. 6 is a plan view of the front suspension.

As shown in FIG. 6, the differential gear 13 has a housing 13a. The housing 13a accommodates components of the differential gear 13 (a ring gear engaged with a gear provided at the front end of the propeller shaft, a case rotating in a unified fashion with the ring gear, a pinion gear held by the case, and left and right side gears engaged with the pinion gear) and is located between the joint parts 14a provided at the ends of the left and right drive shafts 14 in a plan view.

Frame Front Section

As shown in FIG. 3, the body frame 20 has, in its front part, a frame front section 20F located between the left and right front wheels 2. The frame front section 20F is a section that is located forward from the frame middle section 20M supporting the seat 4 and the like, and that has a smaller width than the frame middle section 20M in the left-right direction. A front suspension Sf is arranged to the left and right of the frame front section 20F. The frame front section 20F supports the front wheel 2 via the front suspension Sf so that the front wheel 2 can swing up and down. The front differential gear 13 is supported by the frame front section 20F.

Figure 4:
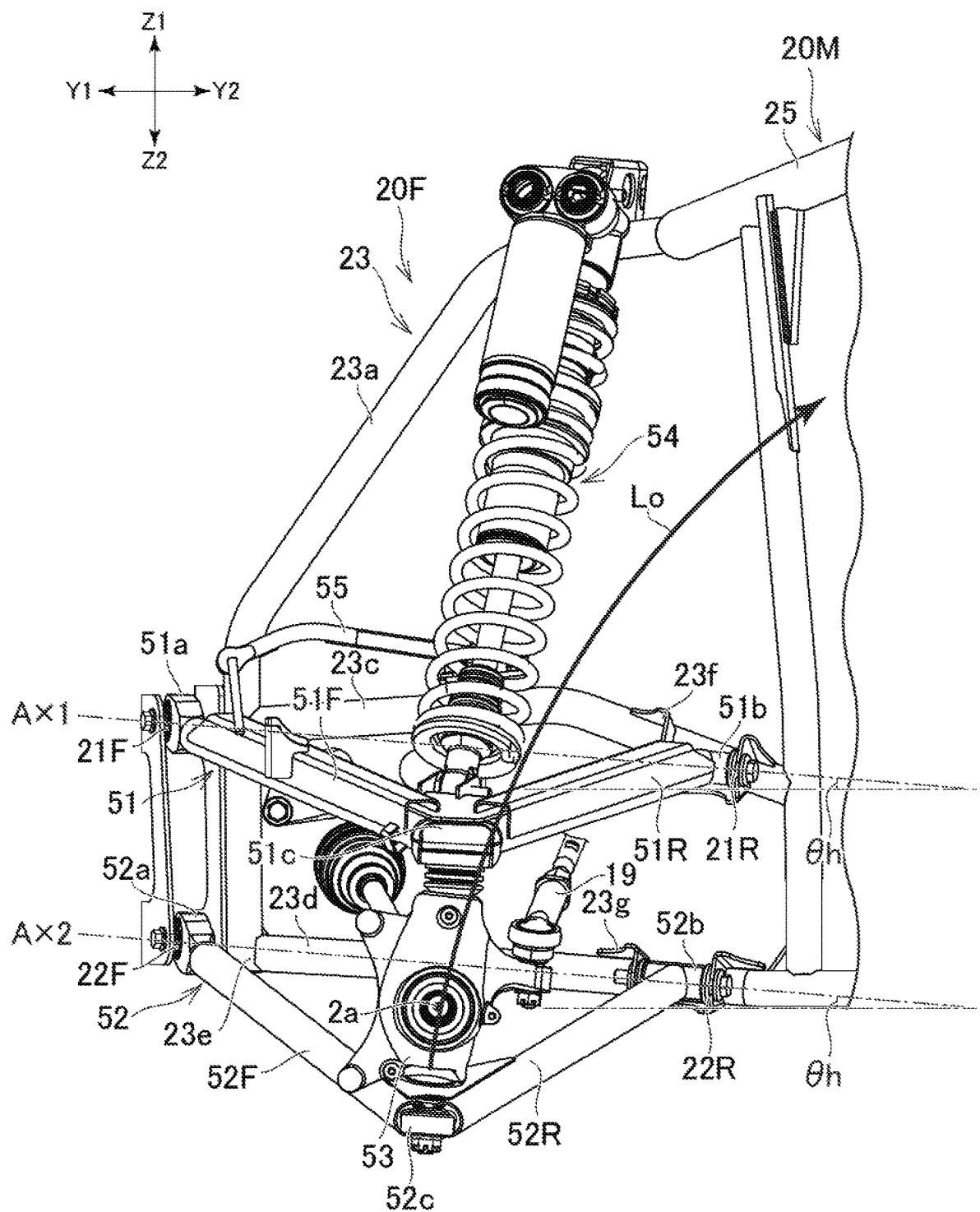
FIG. 4 is a side view of the front suspension.

The frame front section 20F has left and right lateral parts 23 (see FIG. 2), each made up of a plurality of pipes. The left and right lateral parts 23 are coupled to each other via a plurality of rod members and plate members extending in the left-right direction. As shown in FIG. 4, each lateral part 23 has a vertical extension part 23a located in a forefront part of the frame front section 20F and extending in the up-down direction. The vertical extension parts 23a of the left and right lateral parts 23 are spaced apart in the left-right direction. The vertical extension part 23a extends upward from a lower end 23e of the lateral part 23, then bends rearward and extends obliquely upward, and is connected to the frame middle section 20M. More specifically, the frame middle section 20M has, in its forefront part, a lateral extension part 25 (see FIG. 2) extending in the left-right direction, and an upper end of the vertical extension part 23a is connected to the lateral extension part 25. Also, each lateral part 23 has, in its lower part, horizontal parts 23c and 23d extending in the front-rear direction and spaced apart in the up-down direction, as shown in FIG. 4. Front ends of the horizontal parts 23c and 23d are connected to the vertical extension part 23a. In the exampled vehicle 100, each of the vertical extension part 23a and the horizontal parts 23c and 23d is a pipe member.

Outline of Front Suspension

As shown in FIG. 4, the front suspension Sf is a double wishbone suspension and has a lower arm 52 extending outward in the left-right direction from the frame front section 20F, and an upper arm 51 arranged above the lower arm 52 and extending outward in the left-right direction from the frame front section 20F. The front suspension Sf also has a shock absorber 54. An upper end of the shock absorber 54 is coupled to the frame front section 20F. A lower end of the shock absorber 54 is coupled to the upper arm 51. The lower end of the shock absorber 54 may be coupled to the lower arm 52.

The lower arm 52 is substantially triangular in a plan view and has a front rod 52F and a rear rod 52R located rearward from the front rod 52F, as shown in FIG. 4. A proximal part 52a of the front rod 52F and a proximal part 52b of the rear rod 52R are coupled to the frame front section 20F. The frame front section 20F has a front coupling part 22F to which the proximal part 52a of the front rod 52F is coupled, and a rear coupling part 22R to which the proximal part 52b of the rear rod 52R is coupled. As will be described later, the front coupling part 22F is a ball joint, and the rear coupling part 22R is a shaft inserted through the proximal part 52b (tubular proximal part) of the rear rod 52R. The front rod 52F and the rear rod 52R have a common distal end 52c. The distal end 52c is coupled to a lower part of a knuckle 53. A ball joint is used to couple the distal end 52c and the lower part of the knuckle 53.

The upper arm 51 is substantially triangular in a plan view, like the lower arm 52, and has a front rod 51F and a rear rod 51R located rearward from the front rod 51F, as shown in FIG. 4. A proximal part 51a of the front rod 51F and a proximal part 51b of the rear rod 51R are coupled to the frame front section 20F. The frame front section 20F has a front coupling part 21F to which the proximal part 51a of the front rod 51F is coupled, and a rear coupling part 21R to which the proximal part 51b of the rear rod 51R is coupled. As will be described later, the front coupling part 21F is a ball joint, and the rear coupling part 21R is a shaft to which the proximal part 51b (tubular proximal part) of the rear rod 51R is coupled. The front rod 51F and the rear rod 51R have a common distal end 51c. The distal end 51c is coupled to an upper part of the knuckle 53. A ball joint is used to couple the distal end 51c and the upper part of the knuckle 53 as well.

Figure 5:
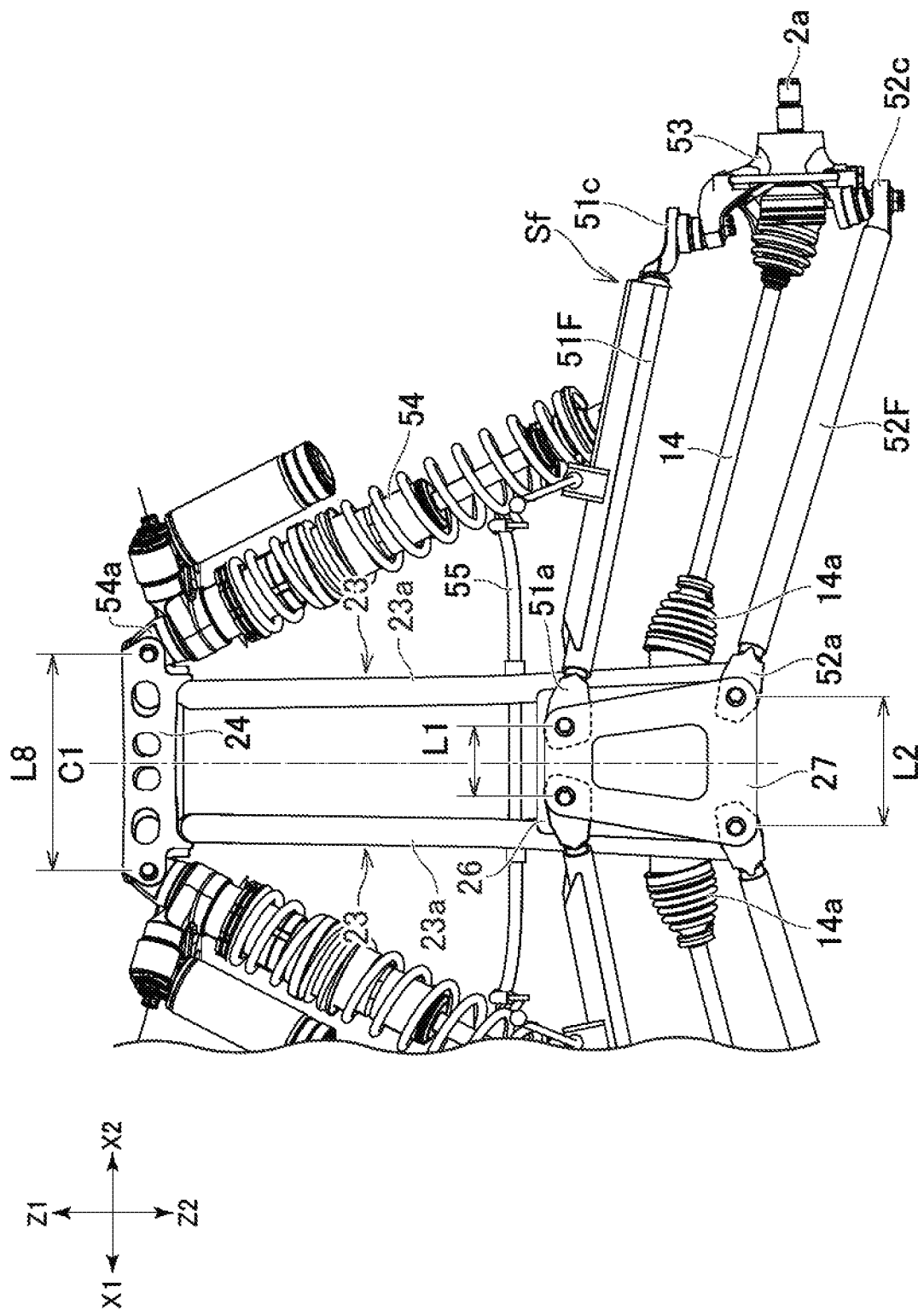
FIG. 5 is a front view of the front suspension.

As shown in FIG. 5, the vehicle 100 has a stabilizer 55 coupling the left and right front suspensions Sf. In the exampled vehicle 100, the stabilizer 55 is coupled to the front rod 51F of the upper arm 51.

Tilt of Rotation Axis of Arm as Viewed in Plan View

As shown in FIG. 4, the upper arm 51 is rotatable about a rotation axis Ax1 passing through the proximal parts 51a and 51b. (The rotation axis Ax1 is an axis passing through the coupling parts 21F, 21R.) Similarly, the lower arm 52 is rotatable about a rotation axis Ax2 passing through the proximal parts 52a and 52b. (The rotation axis Ax2 is an axis passing through the coupling parts 22F and 22R.) Thus, the front wheel 2 can swing up and down relative to the vehicle frame Fv.

As shown in FIG. 6, the rotation axes Ax1 of the left and right upper arms 51 extend forward and obliquely toward the center C1 in the left-right direction of the vehicle body in a plan view. Therefore, the distance L1 between the left and right front coupling parts 21F, to which the proximal parts 51a of the left and right upper arms 51 are coupled respectively, is smaller than a distance L3 between the left and right rear coupling parts 21R, to which the proximal parts 51b on the rear side are coupled respectively. In the exampled vehicle 100, because the rotation axis Ax1 is largely tilted from a straight line passing through the center C1 of the vehicle body in the left-right direction (a straight line along the front-rear direction), the distance L1 between the left and right front coupling parts 21F (in other words, the distance between the proximal parts 51a of the left and right upper arms 51) is smaller than half the distance L3 between the left and right rear coupling parts 21R (in other words, the distance between the proximal parts 51b of the left and right upper arms 51) (L1<L3×½).

As shown in FIG. 6, the left and right front coupling parts 21F are located farther forward than the front differential gear 13. The distance L1 between the left and right front coupling parts 21F is smaller than a width W2 in the left-right direction of the housing 13a of the differential gear 13 (in this specification, the width W2 in the left-right direction of the housing 13a is the distance between a vertical plane passing along the right end of the housing 13a and a vertical plane passing along the left end of the housing 13a). Therefore, the left and right front coupling parts 21F are located between the vertical planes passing along the left and right ends of the housing 13a of the differential gear 13. Meanwhile, the distance L3 between the left and right rear coupling parts 21R is larger than the width W2 in the left-right direction of the housing 13a of the differential gear 13. In the exampled vehicle 100, the left and right rear coupling parts 21R are located farther rearward than the housing 13a of the front differential gear 13.

Apart from the structure in the exampled vehicle 100, the left and right rear coupling parts 21R may be located to the sides of the housing 13a of the front differential gear 13. Also, the distance L3 between the left and right rear coupling parts 21R may be smaller than the width W2 in the left-right direction of the housing 13a of the differential gear 13.

In the exampled vehicle 100, the front coupling part 21F is a ball joint. The distance L1 between the left and right front coupling parts 21F is the distance between the centers of balls 21a (see FIG. 7) forming the front coupling parts 21F. The front coupling part 21F may not have to be a ball joint. For example, the proximal part 51a of the front rod 51F may be tubular and the front coupling part 21F may be a support shaft inserted in the proximal part 51a. In this case, the distance L1 between the left and right front coupling parts 21F may be the distance between the centers of the support shafts (the distance between the centers in the direction of length of the support shafts). The rear coupling part 21R is a support shaft inserted in the tubular part formed in the proximal part 51b of the rear rod 51R. The support shaft is supported by a bracket attached to the frame front section 20F (that is, a bracket attached to the horizontal part 23c). The distance L3 between the left and right rear coupling parts 21R is the distance between the centers of the support shafts (the distance between the centers in the direction of length of the support shafts).

The rotation axes Ax2 of the left and right lower arms 52 are substantially parallel to the rotation axis Ax1 of the upper arm 51. Therefore, the rotation axes Ax2 extend forward and obliquely toward the center C1 in the left-right direction of the vehicle body in a plan view, like the rotation axis Ax1. Therefore, as shown in FIG. 6, a distance L2 between the left and right front coupling parts 22F, to which the proximal parts 52a of the left and right lower arms 52 are coupled respectively, is smaller than a distance L4 between the left and right rear coupling parts 22R, to which the proximal parts 52b on the rear side are coupled respectively. In the exampled vehicle 100, because the rotation axis Ax2 is largely tilted from the straight line passing through the center C1 of the vehicle body in the left-right direction, the distance L2 between the left and right front coupling parts 22F (in other words, the distance between the proximal parts 52a of the left and right lower arms 52) is smaller than half the distance L4 between the left and right rear coupling parts 22R (in other words, the distance between the proximal parts 52b of the left and right lower arms 52) (L2<L4*½).

As shown in FIG. 6, the left and right front coupling parts 22F are located farther forward than the front differential gear 13. The distance L2 between the left and right front coupling parts 22F is smaller than the width W2 in the left-right direction of the housing 13a of the differential gear 13. Therefore, the left and right front coupling parts 22F are located between the vertical planes passing along the left and right ends of the housing 13a of the differential gear 13. Meanwhile, the distance L4 between the left and right rear coupling parts 22R is larger than the width W2 in the left-right direction of the housing 13a of the differential gear 13. In the exampled vehicle 100, the left and right rear coupling parts 22P are located farther rearward than the housing 13a of the front differential gear 13.

Apart from the structure in the exampled vehicle 100, the left and right rear coupling parts 22R may be located to the sides of the housing 13a of the front differential gear 13. Also, the distance L4 between the left and right rear coupling parts 22R may be smaller than the width W2 in the left-right direction of the housing 13a of the differential gear 13.

The distance L3 and the like for the lower arm 52 can be defined similarly to the distance L1 and the like for the upper arm 51. That is, in the exampled vehicle 100, the front coupling part 22F is a ball joint. The distance L3 between the left and right front coupling parts 22F is the distance between the centers of balls forming the front coupling parts 22F. The front coupling part 22F may not have to be a ball joint. For example, the proximal part 52a of the front rod 52F may be tubular and the front coupling part 22F may be a support shaft inserted in the proximal part 52a. In this case, the distance L3 between the left and right front coupling parts 22F may be the distance between the centers of the support shafts (the distance between the centers in the direction of length of the support shafts). The rear coupling part 22R is a support shaft inserted in the tubular part formed in the proximal part 52b of the rear rod 52R. The support shaft is supported by a bracket attached to the frame front section 20F (a bracket attached to the horizontal part 23d). The distance L4 between the left and right rear coupling parts 22R is the distance between the centers of the support shafts (the distance between the centers in the direction of length of the support shafts).

Tilting the rotation axes Ax1, Ax2 in this way to reduce the distances L1, L2 between the left and right front coupling parts 21F and 22F has, for example, the following advantages (1) to (5).

(1) It is desirable that the locus of the front wheel 2 when going over undulating ground is tilted rearward from vertical. As shown in FIG. 6, the rotation axes Ax1, Ax2 are tilted to extend forward and obliquely toward the center C1 in the left-right direction of the vehicle body in a plan view of the vehicle. That is, the rotation axes Ax1, Ax2 are tilted from a vertical plane passing through the center C1 in the left-right direction (in FIG. 6, the angle between the rotation axes Ax1 and Ax2 and the vertical plane is expressed as θv). Thus, the locus Lo (see FIG. 4) of the front wheel 2 when going over undulating ground can be tilted rearward. As will be described later, the rotation axes Ax1 and Ax2 are also tilted from a horizontal plane (in FIG. 4, the angle between the rotation axes Ax1 and Ax2 and the horizontal plane is expressed as θh). Tilting the rotation axes Ax1 and Ax2 from the vertical plane passing through the center C1 in the left-right direction in this manner can optimize the locus Lo of the front wheel 2 without increasing the angle θh to the horizontal plane. Also, in the vehicle 100, the locus Lo is curved rearward, as shown in FIG. 4. That is, the tilt of the locus Lo increases as the position of the front wheel 2 rises. This is because the rotation axes Ax1 and Ax2 are tilted from a straight line along the center C1 in the left-right direction in a plan view of the vehicle.

(2) Increasing the distance between the proximal parts 51a and 52a of the front rods 51F and 52F and the proximal parts 51b and 52b of the rear rods 51R and 52R (that is, the arm span) can increase the rigidity of the arms 51 and 52. In the vehicle 100, since the rotation axes Ax1 and Ax2 are tilted in a plan view, a sufficient arm span can be secured without shifting the position of the proximal parts 51a and 52a of the front rods 51F and 52F forward or without shifting the position of the proximal parts 51b and 52b of the rear rods SIR and 52R rearward. Also, since the locus of the front, wheel 2 can be optimized even if the angle θh between the rotation axes Ax1 and Ax2 and the horizontal plane is small, as described above, a sufficient arm span can be secured without lowering the position of the proximal parts 51b and 52b of the rear rods 51R and 52R (without lowering the minimum ground clearance of the vehicle).

(3) The tilting of the rotation axes Ax1 and Ax2 can increase the length of the arms 51 and 52 (in other words, the distance from the rotation axes Ax1 and Ax2 to the front wheel 2) without increasing the vehicle width. This can reduce the swing angle of the arms 51 and 52 when the front wheel 2 goes over undulating ground and thus can reduce change in the camber angle of the front wheel 2.

(4) The tilting of the rotation axes Ax1 and Ax2 can reduce the width of the frame front section 20F in the left-right direction of the vehicle body. This can concentrate the vehicle weight at the center C1 of the vehicle body in the left-right direction. The tilting of the rotation axes Ax1 and Ax2 can also concentrate the vehicle weight at the center of the vehicle in the front-rear direction.

(5) Due to the tilting of the rotation axes Ax1 and Ax2, the frame front section 20F is substantially trapezoidal in a plan view. This can increase the rigidity of the frame front section 20F.

As shown in FIG. 5, in the examped vehicle 100, the distance L2 between the left and right front coupling parts 22F, to which the lower arm 52 is coupled, is larger than the distance L1 between the left and right front coupling parts 21F, to which the upper arm 51 is coupled. Also, as shown in FIG. 6, the distance L4 between the left and right rear coupling parts 22R, to which the lower arm 52 is coupled, is larger than the distance L3 between the left and right rear coupling parts 21R, to which the upper arm 51 is coupled. The distances L1 and L3 and the distances L2 and L4 are not limited to those in the examped vehicle 100. For example, the distance L1 may be larger than the distance L2. The distance L3 may be larger than the distance L4.

As shown in FIG. 6, the rotation axes Ax1 of the left and right upper arms 51 intersect each other at a point of intersection Q2. Since the rotation axis Ax1 has a large tilt, the distance from the vehicle to the point of intersection Q2 is short. Specifically, a distance L5 from the front coupling part 21F to the point of intersection Q2 is smaller than a distance L6 from the rear coupling part 21R to the front coupling part 21F. In the examped vehicle 100, the distance L5 is the distance from the center of a ball 21a (see FIG. 7) of the ball joint forming the front coupling part 21F to the point of intersection Q2. The distance L6 is the distance from the center in the direction of length of the support shaft forming the rear coupling part 21R to the center of the ball 21a. The rotation axis Ax2 has a large tilt, as the rotation axis Ax1. Therefore, a distance L9 from the front coupling part 22F to a point of intersection Q3 of the rotation axes Ax2 of the left and right lower arms 52 is smaller than a distance L10 from the rear coupling part 22R to the front coupling part 22F, to which the lower arm 52 is coupled. The positions of the pointy of intersection Q2 and Q3 are not limited to those in the examped vehicle 100. For example, the distance L5 to the point of intersection Q2 may be the same as or larger than the distance L6 from the rear coupling part 21R to the front coupling part 21F. Also, the distance L9 to the point of intersection Q3 may be the same as or larger than the distance L10 from the rear coupling part 22R to the front coupling part 22F.

Tilt of Rotation Axis of Arm in Side View

As shown in FIG. 4, in the examped vehicle 100, the rotation axes Ax1 and Ax2 extend forward and obliquely upward as viewed in a side view of the vehicle. That is, the rotation axes Ax1 and Ax2 are tilted from the horizontal plane (in FIG. 4, the angle between the rotation axes Ax1 and Ax2 and the horizontal plane is expressed as θh). As described above, the rotation axes Ax1 and Ax2 are tilted from the vertical plane passing through the center C1 in the left-right direction in a plan view of the vehicle (in FIG. 6, the angle between the rotation axes Ax1 and Ax2 and the vertical plane is expressed as θv). The locus Lo of the front wheel 2 depends on the angle θh to the horizontal plane and the angle θv to the vertical plane. The sum (θh+θv) of the angle θh and the angle θv is, for example, 10 degrees or greater and 30 degrees or smaller.

In the examped vehicle 100, the angle θv (see FIG. 6) of the rotation axes Ax1 and Ax2 to the vertical plane passing through the center C1 in the left-right direction is greater than the angle θh (see FIG. 4) of the rotation axes Ax1 and Ax2 to the horizontal plane. Apart from the structure in the examped vehicle 100, the angle θv (see FIG. 6) may be the same as or smaller than the angle θh (see FIG. 4).

Distance Between Left and Right Front Coupling Parts, and Other Components

As shown in FIG. 3, the left and right seats 4 are located to the rear of the left and right front suspensions Sf. In the examped vehicle 100, the left and right front coupling parts 21F, to which the upper arm 51 is coupled, are located between the left and right seats 4 in a front view of the vehicle. In other words, the left and right front coupling parts 21F are located more closely to the center C1 in the left-right direction than a vertical plane P1 passing along the end of the seat 4 (the end closer to the center C1 of the vehicle body in the left-right direction). Similarly, the left and right front coupling parts 22F, to which the lower arm 52 is coupled, are located between the left and right seats 4. In other words, the left and right front coupling parts 22F are located more closely to the center C1 of the vehicle body in the left-right direction than the vertical plane P1 passing along the end of the seat 4.

The distance L1 (see FIG. 6) between the left and right front coupling parts 21F, to which the upper arm 51 is coupled, is smaller than a width W7 (see FIG. 3) of the engine 1 in the left-right direction. That is, the left and right front coupling parts 21F are located between a vertical plane P3 passing along the right end of the engine 7 and a vertical plane P4 passing along the left end of the engine 7. Similarly, the distance L2 (see FIG. 6) between the left and right front coupling parts 22F, to which the lower arm 52 is coupled, is smaller than the width W7 of the engine 7 in the left-right direction. That is, the left and right front coupling parts 22F are located between the vertical plane P3 passing along the right end of the engine 7 and the vertical plane P4 passing along the left end of the engine 7.

As described above, the front suspension Sf has the shock absorber 54. As shown in FIG. 5, an upper end 54a or the shock absorber 54 is connected to the frame front section 20F. More specifically, the upper end 54a of the shock absorber 54 is coupled to a stay 24 provided in an upper part of the frame front section 20F and extending in the left-right direction. As shown in FIG. 4, in a side view of the vehicle, the shock absorber 54 is tilted such that the upper end 54a is located farther rearward than the lower end, and the shock absorber 54 expands and contracts on a plane orthogonal to the rotation axes Ax1 and Ax2 of the arms 51 and 52.

As shown in FIG. 5, the shock absorber 54 is tilted such that its upper part approaches the center C1 of the vehicle body in the left-right direction. The distance L1 between the left and right front coupling parts 21F, to which the upper arm 51 is coupled, is smaller than a distance L8 between the upper ends 54a of the left and right shock absorbers 54. Similarly, the distance L2 between the left and right front coupling parts 22F, to which the lower arm 52 is coupled, is smaller than the distance L8 between the upper ends 54a of the left and right shock absorbers 54.

The structure of the front suspension Sf is not limited to that in the exampled vehicle 100. For example, only one of the distance L1 between the front coupling parts 21F, to which the upper arm 51 is coupled, and the distance L2 between the left and right front coupling parts 22F, to which the lower arm 52 is coupled, may be smaller than the width W2 of the housing 13a of the differential gear 13, and the other distance may be larger than the width W2 of the housing 13a.

Positional Relation Between Front Coupling Part and Frame

As described above, each lateral part 23 of the frame front section 20F has the vertical extension part 23a. As shown in FIG. 4, the vertical extension part 23a is a columnar member which extends upward from its lower end and is located at the forefront of the frame front section 20F and to which a front part of the horizontal parts 23c and 23d is connected. The front proximal parts 51a and 52a of the left and right arms 51 and 52 are located farther forward than the vertical extension part 23a in a side view of the vehicle. Therefore, a pipe member (specifically, the vertical extension part 23a and the horizontal parts 23c and 23d) forming the frame front section 20F is not present between the proximal parts 51a and 52a of the left and right arms 51 and 52. This can reduce the distance between the proximal parts 51a and 52a of the left and right arms 51 and 52 (in other words, the distances L1 and L2 between the front coupling parts 21F and 22F). Thus, the tilt angle θv of the rotation axes Ax1 and Ax2 is easily optimized. Also, the length of the arms 51 and 52 can be optimized and the vehicle weight can be concentrated at the center C1 of the vehicle body in the left-right direction.

The positions of the front proximal parts 51a and 52a of the arms 51 and 52 are not limited to those in the exampled vehicle 100. For example, the front proximal parts 51a and 52a may be located farther rearward than the front end of the frame front section 20F (the vertical extension part 23a and a support part 26, described later). In other words, the front coupling parts 21F and 22F may be supported at a position farther rearward than the front end of the frame front section 20F. This can prevent an obstacle on the traveling path from hitting on the front coupling parts 21F and 22F.

The structure of the frame front section 20F is not limited to that in the exampled vehicle 100. For example, the frame front section 20F may have a part located farther forward than the vertical extension part 23a (for example, a stay protruding farther forward than the vertical extension part 23a). As still another example, the vertical extension part 23a may not have to be a pipe member or a columnar member. The vertical extension part 23a may be, for example, a plate member located at the forefront of the frame front section 20F and connected to the horizontal parts 23c and 23d.

As shown in FIG. 5, the front proximal parts 51a and 52a of the left and right arms 51 and 52 are coupled to the front coupling parts 21F and 22F at a position closer to the center C1 of the vehicle body than the lateral part 23 (more specifically, the vertical extension part 23a) of the frame front section 20F. That is, the left and right front coupling parts 21F and 22F are located between the left and right vertical extension parts 23a in a front view of the vehicle. As will be described later, the front coupling parts 21F and 22F are supported by a support part 26 disposed between the left and right vertical extension parts 23a and thus bridging the space between these vertical extension parts 23a. This structure of the arms 51 and 52 brings the positions of the front coupling parts 21F, 22F closer to the center C1 of the vehicle body and therefore easily optimizes the tilt angle θv of the rotation axes Ax1 and Ax2 of the arras 51 and 52. Thus, the rearward and upward locus Lo (see FIG. 4) of the front wheel 2 can be easily achieved. Also, a sufficient length of the arms 51 and 52 (the distance from the rotation axes Ax1 and Ax2 to the front wheel 2) can be adequately secured.

Apart from the structure in the exampled vehicle 200, the left and right front coupling parts 21F and 22F may overlap the vertical extension part 23a in a front view of the vehicle. Also, the left and right front coupling parts 21F and 22F may be located farther rearward than the vertical extension part 23a as viewed in a side view of the vehicle. As still another example, only one of the left and right front coupling parts 21F and 22F (for example, the front coupling part 21F) may be located between the left and right lateral parts 23, and the other front coupling part (for example, the front coupling part 22F) may be located on the outer side of the left and right lateral parts 23 in a front view of the vehicle.

As described above, the rear proximal parts 51b and 52b of the left and right arms 51 and 52 are supported by the rear coupling parts 21R and 22R. As shown in FIG. 4, the rear coupling parts 21R and 22R are supported by the lateral part 23 of the frame front section 20F and located farther outward in the direction of vehicle width than the lateral part 23. The rear coupling parts 21R and 22R (the support shafts inserted in the proximal parts 51b and 52b) are supported by brackets 23f and 23g fixed to the side of the horizontal parts 23c and 23d. Therefore, unlike the left and right front coupling parts 21F and 22F, the left and right rear coupling parts 21R and 22R are located farther outward in the direction of vehicle width than the left and right lateral part 23. The rear parts of the horizontal parts 23c and 23d, in which the brackets 23f and 23g are attached, are tilted with respect to a straight line passing through the center C1 in the left-right direction of the vehicle body in accordance with the rotation axes Ax1 and Ax2 of the arms 51 and 52. Further, the rear part of the upper horizontal part 23c extends forward and obliquely upward in a side view of the vehicle.

Ball Joint

Figure 7:
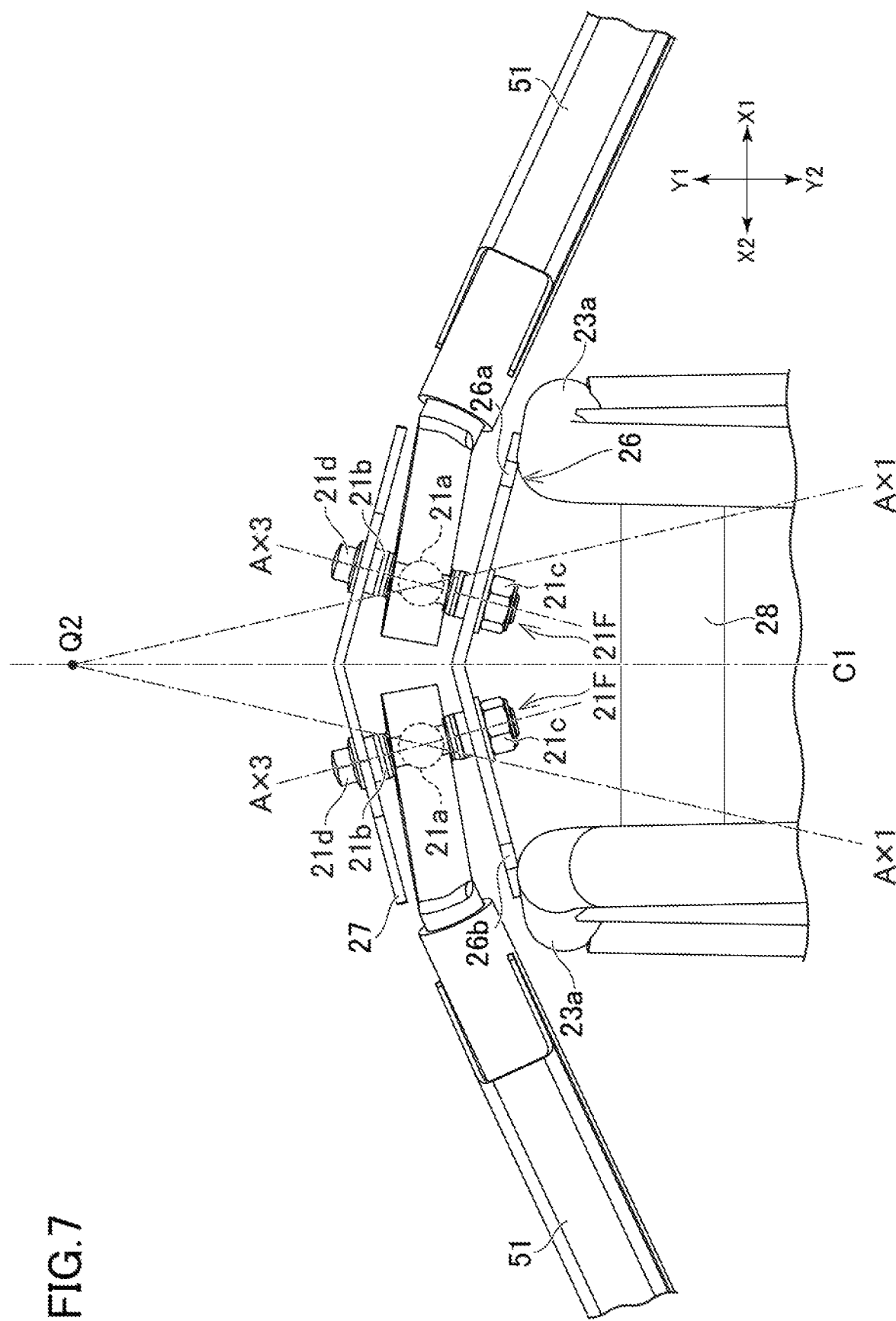
FIG. 7 is a plan view showing a coupling part between a front rod and the vehicle frame.

As described above, the front coupling part 23F, to which the upper arm 51 is coupled, is a ball joint. As shown in FIG. 7, the front coupling part 21F has a ball 21a and a rod 21b supporting the ball 21a. The rod 21b extends in two directions (forward and rearward) from the ball 21a. In the exampled vehicle 100, the rod 21b is inserted in a penetration hole formed in the ball 21a and supports the ball 21a. The rod 21b is supported by the frame front section 20F. More specifically, the plate-like support part 26 fixed to the left and right vertical extension parts 23a is provided at the forefront of the frame front section 20F. The frame front section 20F also has a cross part 28 coupling forefront parts of the left and right vertical extension parts 23a. The support part 26 is located farther forward than the cross part 28. The rod 21b of the front coupling part 21F is attached to the support part 26 and protrudes forward from the support part 26. In the exampled vehicle 100, the rod 21b is a bolt, which is inserted in an attaching hole formed in a coupling member 27, described later, and an attaching hole formed in the support part 26 and is fixed to the support part 26 by a nut 21c. Since the rod 21b protrudes forward from the support part 26 bridging the space between the left and right vertical extension parts 23a, the front coupling part 21F (more specifically, the ball 21a and the rod 21b) is located between the left and right vertical extension parts 23a.

Using a ball joint as the front coupling part 21F enables relatively free setting of the direction of the rod 21b. Thus, the distance between the proximal parts 51a of the left and right upper arms 51, in other words, the distance L1 between the left and right front coupling parts 21F, is easily reduced. In a structure where the proximal part Sla of the upper arm 51 is tubular and where the support shaft fixed to the frame front section 20F is inserted in the proximal part 51a, the left and right support shafts (the support shaft supporting the proximal part 51a of the right upper arm 51 and the support shaft supporting the proximal part 51a of the left upper arm 51) need to be arranged on and along the rotation axis Ax1. Therefore, the front ends of the left and right support shafts tend to interfere with each other and this makes it difficult to reduce the distance between the left and right support shafts. Meanwhile, in the structure of the vehicle 100 using a ball joint as the front coupling part 21F, the direction of the rod 21b need not coincide with the rotation axis Ax1 and therefore interference between the left and right rods 21b can be easily avoided.

As shown in FIG. 7, in the exampled vehicle 100, the rod 21b is tilted outward in the left-right direction from the rotation axis Ax1 of the upper arm 51 (in FIG. 1, the direction of extension of the rod 21b is indicated by a dash-dotted line Ax3). That is, a front end 21d of the rod 21b is located outward in the left-right direction from the rotation axis Ax1. This arrangement can avoid interference of the front ends 21d of the left and right rods 21b. In the exampled vehicle 100, the rod 21b is tilted with respect to a straight line passing through the center C1 of the vehicle body in the left-right direction. Apart from the structure in the exampled vehicle 100, the rod 21b may be parallel to the straight line passing through the center C1 of the vehicle body in the left-right direction.

As shown in FIG. 7, in the exampled vehicle 100, the support part 26 has a V-shape opening to the rear, as viewed in a plan view. That is, the support part 26 bends at the position of the center C1 and has right part 26a and a left part 26b. The rod 21b of the right front coupling part 21F extends in a direction orthogonal to the right part 26a. The rod 21b of the left front coupling part 21F extends in a direction orthogonal to the left part 26b.

Although the front coupling part 22F, to which the lower arm 52 is coupled, is not illustrated in FIG. 7, its attaching structure is similar to that of the front coupling part 21F, to which the upper arm 51 is coupled. That is, the front coupling part 22F is a ball joint and has a ball 22a and a rod 22b (see FIG. 6). The rod 22b is, for example, a bolt, which is inserted in a penetration hole formed in the ball 22a and supports the ball 22a. The rod 22b of the front coupling part 22F, too, is attached to the support part 26 and protrudes forward from the support part 26. Therefore, the front coupling part 22F is located between the left and right vertical extension parts 23a. Also, like the rod 21b of the front coupling part 21F, the rod 22b of the front coupling part 22F is tilted outward in the left-right direction from the rotation axis Ax2 of the lower arm 52.

The attaching structures of the front coupling parts 21F, 22F are not limited to those in the exampled vehicle 100. For example, the support part 26 supporting the front coupling parts 21F and 22F may be fixed at a position farther rearward from the vertical extension part 23a. This enables the vertical extension part 23a to protect the front coupling parts 21F and 22F. The support part 26 may not have to be in the shape of a plate. For example, the support part 26 may be a rod member extending in the left-right direction. In this case, the frame front section 20F may have two support parts 26 spaced apart in the up-down direction. The front coupling part 21F, to which the upper arm 51 is coupled, may be fixed to the upper support part 26. The front coupling part 22F, to which the lower arm 52 is coupled, may be fixed to the lower support part 26. As still another example, only one of the upper front coupling part 21F and the lower front coupling part 22F may be a ball joint. For example, the upper front coupling part 21F may be a ball joint and the lower front coupling part 22F may be a support shaft. That is, the proximal part 52a of the lower arm 52 may be tubular and the support shaft, which is the front coupling part 22F, may be inserted in the tubular proximal part 52a.

Coupling Member

As shown in FIGS. 4 and 1, the vehicle 100 has a plate-like coupling member 27 coupling the front ends of the rods 21b and 22b of the front coupling parts 21F and 22F. The coupling member 27 and the support part 26 are arranged to face each other in the front-rear direction, and the proximal parts 51a and 52a of the arms 51 and 52 are located between the coupling member 27 and the support part 26. The coupling member 27 is fixed to the rods 21b and 22b of the four front coupling parts 21F and 22F. In this structure, a load acting on one of the front coupling parts 21F and 22F via the arm 51 and 52 can be received by the other three of the front coupling parts 21F and 22F as well as the one of the front coupling parts 21F and 22F. Therefore, the strength of support of the front coupling parts 21F and 22F (the strength of support of the rods 21b and 22b) can be increased. In the exampled vehicle 100, the coupling member 27 has a V-shaped opening rearward (see FIG. 7), like the support part 26. The coupling member 27 is not connected to the frame front section 20F. That is, the coupling member 27 is not an element of the frame front section 20F. Therefore, the coupling member 27 can be removed from the rods 21b and 22b. This can facilitate maintenance work on the vehicle. Apart from the structure in the exampled vehicle 100, the coupling member 27 may be connected to the frame front section 20F.

The structure to increase the strength of support of the front coupling parts 21F and 22F is not limited to that in the exampled vehicle 100. For example, the vehicle 100 may have a coupling member which couples the rods 21b of the left and right front coupling parts 21F, to which the upper arm 51 is coupled, and a coupling member which couples the rods 22b of the left and right front coupling parts 22F, to which the lower arm 52 is coupled. As still another example, the vehicle 100 may have a coupling member which couples the right front coupling part 21F and the right front coupling part 22F, and a coupling member which couples the left front coupling part 21F and the left front coupling part 22F. In still another example, the rods 21b and 22b of the front coupling parts 21F and 22F may be connected not to the rods 21b and 22b of the other front coupling parts 21F and 22F but to the frame front section 20F via a coupling member.

Relation Between Tie Rod and Rotation Axis of Arm

As shown in FIG. 4, the vehicle 100 has a tie rod 19 connected to a lower end of a steering shaft (not illustrated)

extending downward from the steering wheel 6. The tie rod 19 extends in the left-right direction and its end is coupled to the knuckle 53. More specifically, the end of the tie rod 19 is coupled to a rear part of the knuckle 53 via a ball joint. The tie rod 19 is located farther rearward than the drive shaft 14.

As shown in FIG. 6, as viewed in a plan view of the vehicle, the angle formed between the rotation axes Ax1 and Ax2 of the arms 51 and 52 and the tie rod 19 (the angle formed to the front of the tie rod 19) θt is 90 degrees or greater. This positional relation between the tie rod 19 and the rotation axes Ax1 and Ax2 allows the front wheel 2 to easily move in a toe-out direction at the time of braking on the vehicle 100. That is, the front end of the front wheel 2 can easily move outward in the left-right direction at the time of braking on the vehicle 100.

Figure 8A:
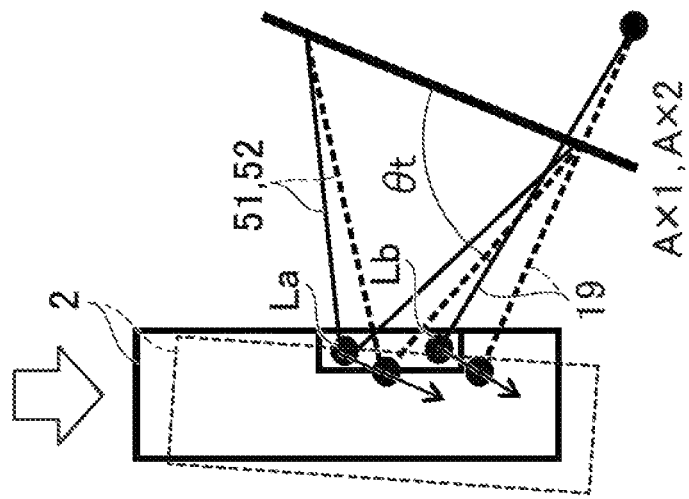
FIGS. 8A and 8B are schematic plan views showing the influence of a tie rod on the movement of the front wheel at the time of braking.
Figure 8B:
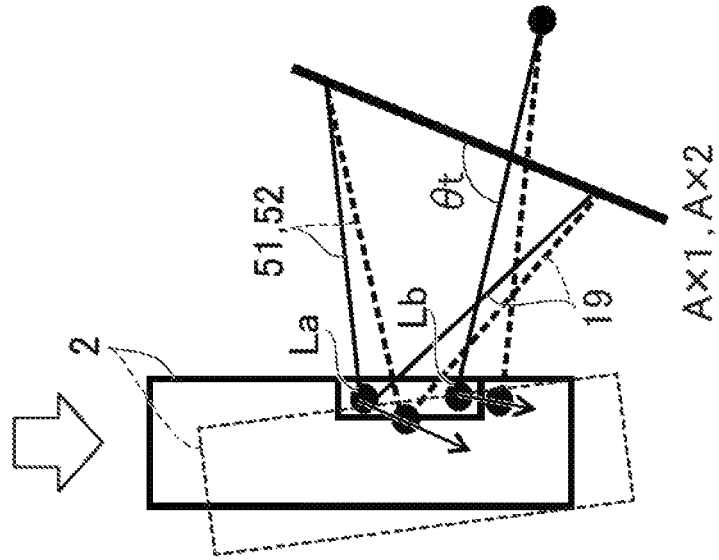

FIGS. 8A and 8B are schematic plan views for explaining the influence of the tie rod 19 on the movement of the front wheel 2 at the time of braking. In the structure shown in FIG. 8A, the angle θt between the tie rod 19 and the rotation axes Ax1 and Ax2 of the arms 51 and 52 is smaller than 90 degrees. Meanwhile, in the structure shown in FIG. 8B, the angle θt between the tie rod 19 and the rotation axes Ax1 and Ax2 of the arms 51 and 52 is greater than 90 degrees. At the time of braking with the front wheel 2, a force that pulls the front wheel 2 rearward acts from the ground. At this time, a tensile stress acts on the front rods 51F and 52F of the arms 51 and 52, and a compressive stress acts on the rear rods 51R and 52R. Therefore, the front rods 51F and 52F of the arms 51 and 52 expand and the rear rods 51R and 52R contract. Thus, as shown in FIG. 6A, a coupling part (ball joint) La between the ends of the arms 51 and 52 and the knuckle 53 moves rearward and outward in the left-right direction. At this time, with the movement of the knuckle 53, the tie rod 19 tilts rearward. If the angle θt between the rotation axes Ax1 and Ax2 and the tie rod 19 is smaller than 90 degrees, as shown in FIG. 8A, the coupling part Lb between the tie rod 19 and the knuckle 53 moves farther outward than the coupling part (ball joint) La between the ends of the arms 51 and 52 and the knuckle 53. Therefore, the front wheel 2 tends to be displaced in a toe-in direction. Meanwhile, if the angle θt between the rotation axes Ax1 and Ax2 and the tie rod 19 is greater than 90 degrees, as shown in FIG. 8B, the coupling part Lb between the tie rod 19 and the knuckle 53 does not move as outward as the coupling part (ball joint) La between the ends of the arms 51 and 52 and the knuckle 53. Thus, the front wheel 2 tends to be displaced in a toe-out direction. In the exampled vehicle 100, since the rotation axes Ax1 and Ax2 are tilted, the angle θt that is greater than 90 degrees can be secured between the rotation axes Ax1 and Ax2 and the tie rod 19. The force pulling the front wheel 2 rearward also acts, for example, when the front wheel 2 goes over an uneven road surface or the like. Therefore, in this case, too, the structure of the vehicle 100 allows the front wheel 2 to be displaced easily in a toe-out direction.

SUMMARY (1) As described above, in the vehicle 100, each of the left and right upper arms 51n and each of the left and right lower arms 52 are rotatable about the rotation axes Ax1 and Ax2 extending forward and obliquely toward the center in the left-right direction in a plan view and passing through the proximal parts 51a, 51b, 52a and 52b. The frame front section 20F has the left and right front coupling parts 21F, to which the proximal parts 51a of the front rods 51F of the left and right upper arms 51 are coupled respectively, and has the left and right front coupling parts 22F, to which the proximal parts 52a of the front rods 52F of the left and right lower arms 52 are coupled respectively. The distances L1 and L2 between the left and right front coupling parts 21F and 22F are smaller than the width W2 in the left-right direction of the housing 13a of the differential gear 13. Compared with the related-art structure, vehicle 100 can optimize the locus Lo (FIG. 4) of the front wheel 2 when going over undulating ground, while reducing the tilt angle θh of the rotation axes Ax1 and Ax2 to the horizontal plane. Also, since the tilt angle θv of the rotation axes Ax1 and Ax2 to the vertical plane (C1) can be enlarged, a sufficient arm span is easily secured without shifting the position of the proximal part of the front rod forward, without raising the position of the proximal part of the front rod, and without lowering the position of the proximal part of the rear rod (without lowering the minimum ground clearance). Moreover, since the distances L1 and L2 between the left and tight front coupling parts 21F and 22F are smaller than the width W2 of the housing 13a of the differential gear 13, a sufficient length of the arms 51 and 52 is easily attained. Apart from the structure in the exampled vehicle 100, one of the distances L1 and L2 may be smaller than the width W2 in the left-right direction of the housing 13a of the differential gear 13, and the other of the distances L1 and L2 may be the same as or larger than the width W2 of the housing 13a.

(2) In the vehicle 100, each of the left and right upper arms 51 and each of the left and right lower arms 52 are rotatable about the rotation axes Ax1 and, Ax2 extending forward and obliquely toward the center in the left-right direction in a plan view and passing through the proximal parts 51a, 51b, 52a and 52b. The frame front section 20F has the left and right front coupling parts 21F to which the proximal parts 51a of the front rods 51F of the left and right upper arms 51 are coupled respectively, and has the left and right front coupling parts 22F to which the proximal parts 52a of the front rods 52F of the left and right lower arms 52 are coupled respectively. The left and right front coupling parts 21F and 22F are located between the left and right seats 4 as viewed in a front view of the vehicle. The vehicle 100, can optimize the locus Lo (FIG. 4) of the front wheel 2 when going over undulating ground, while reducing the tilt angle θh of the rotation axes Ax1 and Ax2 to the horizontal plane, compared with the related-art structure. Also, since the tilt angle θv of the rotation axes Ax1 and Ax2 to the vertical plane (C1) can be enlarged, a sufficient arm span can be secured without shifting the position of the proximal part of the front rod forward, without raising the position of the proximal pact of the front, rod, or without lowering the position of the proximal part of the rear rod (without lowering the minimum ground clearance). Moreover, since the loft and right front coupling parts 21F and 22F ace located between the left and right seats 4, the length of the arms 51 and 52 is easily secured. Apart from the structure in the exampled vehicle 100, only one of the left and right front coupling parts 21F and 22F may be located between the left and right seats 4 as viewed in a front view of the vehicle, and the other of the left and right front coupling parts 21F and 22F may be not located between the left and right seats 4 as viewed in a front view of the vehicle.

(3) The frame front section 20F has the left and right vertical extension parts 23a located in the front part of the frame front section 20F and extending in the up-down direction. The left and eight front coupling parts 21F and 22F are located more closely to the center C1 of the vehicle body in the left-right direction than the left and right vertical extension parts 23a. This structure makes it easy to optimize the tilt of the rotation axes Ax1 and Ax2 of the arms 51 and 52. This structure also makes it easy to secure the length of the first arm.

(4) The frame front section 20F has the left and right rear coupling parts 21R, to which the proximal parts 51b of the rear rods 51R of the left and right upper arms 51 are connected respectively. The distance L5 from the front coupling part 21F to the point of intersection Q2 (see FIG. 6) of the rotation axes Ax1 of the left and right upper arms 51 in a plan view of the vehicle may be the same as, or smaller than, the distance L6 from the rear coupling part 21R to the front coupling part 21F in a plan view of the vehicle. This structure makes it easy to optimize the tilt of the rotation axes Ax1 and Ax2 of the arms 51 and 52. This structure also makes it easy to secure the length of the arms 51, 52.

(5) The distance L1 between the left and right front coupling parts 21F may be smaller than the width W7 (FIG. 3) of the engine 7 in the left-right direction.

(6) The frame front section 20F may have the vertical extension part 23a located in the front part of the frame front section 20F and extending in the up-down direction. The proximal parts 51a of the front rods 51F of the left and right upper arms 51 may be located farther forward than the vertical extension part 23a in a side view of the vehicle. This structure makes it easy to reduce the distance between the proximal parts 51a of the left and right front rods 51F and secure the length of the upper arm 51 in the left-right direction, because the proximal parts 51a of the left and right upper arms 51 are located farther forward than the vertical extension part 23a of the frame front section 20F.

(7) Each of the left and right front coupling part 21F and 22F is a ball joint. This makes it easy to reduce the distance L1 between the left and right front coupling parts 21F, optimize the tilt of the rotation axes Ax1 and Ax2 of the arms 51 and 52, and secure the length of the first arm.

(8) The ball joints, as the front coupling parts 21F and 22F, have the balls 21a and 22a and the rods 21b and 22b supporting the balls 21a and 22a. The rod 21b is tilted from the rotation axis Ax1. Thus, the front ends of the rods 21b of the left and right ball joints can be prevented from interfering with each other while the distance L1 between the left and right ball joints (front coupling parts 21F) is reduced.

(9) The left and right front coupling parts 21F and 22F have the rods 21b and 22b protruding from the frame front section 20F. The coupling member 27 is attached to the rods 21b and 22b of the left and right front coupling parts 21F and 22F to couple the rods 21b and 22b to another part. Thus, the strength of support of the front coupling parts 21F and 22F can be increased.

(10) The ends of the rods 21b and 22b of the left and right front coupling parts 21F and 22F are coupled to each other by the coupling member 27. Thus, the strength of support of the front coupling parts 21F and 22F can be increased by a simple structure.

(11) The rotation axes Ax1 and Ax2 not only extend forward and obliquely toward the center C1 in the left-right direction in a plan view, but also extend forward and obliquely upward in a side view of the vehicle. Thus, the locus Lo of the front wheel when going over undulating ground can be optimized further.

(12) When the angle between the rotation axes Ax1 and Ax2 and a straight line along the front-rear direction (a straight line passing through the center C1 in the left-right direction) in a plan view of the vehicle is θv and the angle between the rotation axes and a straight line (horizontal plane) along the front-rear direction in a side view of the vehicle is θh, θv+θh is 10 degrees or greater and 30 degrees or smaller. This vehicle can optimize the angles θh and θv.

(13) When the angle between the rotation axis Ax1 and a straight line along the front-rear direction (a straight line passing through the center C1 in the left-right direction) in a plan view of the vehicle is θv (see FIG. 6) and the angle between the rotation axis and a straight line (horizontal plane) along the front-rear direction as viewed in a side view of the vehicle is θh (see FIG. 4), the angle θv may be greater than the angle θh. This vehicle can easily optimize the angle 9v and the angle θh. Apart from the structure in the exampled vehicle 100, the 8v may be the same as or smaller than the angle θh.

(14) Each of the left and right lower arms 52 has the front rod 52F and the rear rod 52R. Each of the left and right lower arms 52 is rotatable about the rotation axis Ax2 extending forward and obliquely toward the center in the left-right direction in a plan view and passing through the proximal parts 52a and 52b.

(15) The frame front section 20F has the left and right front coupling parts 22F, to which the proximal parts 52a of the front rods 52F of the lower arms 52 are connected respectively. The distance L2 between the left and right front coupling parts 22F is smaller than the width W2 in the left-right direction of the housing 13a of the differential gear 13.

(16) The angle θt formed on the front side of the tie rod 19 and between the rotation axis Ax1 and the tie rod 19 is 90 degrees or greater. Thus, for example, when a braking force acts on the front wheel 2, the front wheel 2 can easily move in a toe-out direction. A force pulling the front wheel 2 rearward also acts when the front wheel 2 goes over an uneven road surface or the like. Therefore, in this case, too, the structure of the vehicle 100 allows the front wheel 2 to easily move in a toe-out direction.

(17) The frame front section 20F has the left and right rear coupling parts 21R to which the left and right upper arms 51 are connected respectively, and the left and right rear coupling parts 22R to which the left and right lower arms 52 are connected respectively. In the exampled vehicle 100, the distances L3 and L4 between the left and right rear coupling parts 21R and 22R are larger than the width W2 in the left-right direction of the housing 13a of the differential gear 13. This makes it easy to optimize the tilt of the rotation axes Ax1 and Ax2 of the arms 51 and 52. Only one of the distances L3 and L4 may be larger than the width W2 in the left-right direction of the housing 13a of the differential gear 13.

(18) The left and right front coupling parts 21F and 22F are located to the front of the housing 13a of the differential gear 13, in a plan view. The left and right rear coupling parts 21R and 22R are located farther rearward than the housing 13a of the differential gear 13, in a plan view. This increases the width in the front-rear direction of the arms 51 and 52 and therefore makes it easy to secure the rigidity of the arms 51 and 52. Apart from the structure in the exampled vehicle 100, only one of the front coupling parts 21F and 22F may be located to the front of the housing 13a. Also, only one of the rear coupling parts 21R and 22R may be located farther rearward than the housing 13a.

(19) The frame front section 20F has the left and right rear coupling parts 21R to which the left and right upper arms 51 are connected respectively, and the left and right rear coupling parts 22R to which the left and right lower arms 52 are connected respectively. The distances L3 and L4 between the left and right rear coupling parts 21R and 22R may be smaller than the width W2 in the left-right direction of the housing 13a of the differential gear 13. This makes it easier to secure the length of the arms 51 and 52. One of the distances L3 and L4 may be larger than the width W2 in the left-right direction of the housing 13a of the differential gear 13.

This disclosure is not limited to the exampled vehicle 100 and various changes may be made. For example, the front coupling parts 21F and 22F, to which the arms 51 and 52 are coupled, may not have to be located farther forward than the vertical extension part 23a of the frame front section 20F. For example, the frame front section 20F may have a bracket located farther rearward than the vertical extension part 23a and supporting the front coupling parts 21F and 22F (for example, the rods 21b and 22b of the ball joints).

The front coupling parts 21F and 22F may not have to be ball joints. For example, the proximal parts 51a and 52a of the arms 51 and 52 may be tubular, and the front coupling parts 21F and 22F may be support shafts inserted in the proximal parts 51a and 52a. In this case, a bracket to support the support shaft may be attached to the lateral side of the horizontal parts 23c and 23d of the frame front section 20F. In this case, for example, tilting the horizontal parts 23c and 23d can tilt the rotation axes Ax1 and Ax2 of the arms 51 and 52.

What is claimed is:
1. A vehicle comprising:
a vehicle frame;
a left front wheel and a right front wheel;
a left first arm supporting the left front wheel and a right first arm supporting the right front wheel; and
a housing accommodating a differential gear located between the left and right first arms in a plan view,
wherein
each of the left and right first arms has a front rod having a proximal part coupled to the vehicle frame, and a rear rod having a proximal part coupled to the vehicle frame at a position farther rearward than the front rod,
each of the left and right first arms is rotatable about a rotation axis extending forward and obliquely toward a center in a left-right direction in a plan view and passing through the two proximal parts,
the vehicle frame has left and right first front coupling parts to which the proximal parts of the front rods of the left and right first arms are coupled respectively, and
the vehicle frame comprises left and right first rear coupling parts to which the proximal parts of the rear rods of the left and right first arms are connected respectively, and
a distance in a plan view from the first front coupling part to a point of intersection of the rotation axes of the left and right first arms is the same as, or smaller than, a distance in a plan view from the first rear coupling part to the first front coupling part.
2. A vehicle comprising:
a vehicle frame;
a left front wheel and a right front wheel;
a left first arm supporting the left front wheel and a right first arm supporting the right front wheel; and
a housing accommodating a differential gear located between the left and right first arms in a plan view,
wherein
each of the left and right first arms has a front rod having a proximal part coupled to the vehicle frame, and a rear rod having a proximal part coupled to the vehicle frame at a position farther rearward than the front rod,
each of the left and right first arms is rotatable about a rotation axis extending forward and obliquely toward a center in a left-right direction in a plan view and passing through the two proximal parts,
the vehicle frame has left and right first front coupling parts to which the proximal parts of the front rods of the left and right first arms are coupled respectively, and
each of the left and right first front coupling parts is a ball joint.
3. The vehicle according to claim 2, wherein
each ball joint includes a ball and a rod supporting the ball, and wherein the rod is tilted with respect to the rotation axis.
4. A vehicle comprising:
a vehicle frame;
a left front wheel and a right front wheel;
a left first arm supporting the left front wheel and a right first arm supporting the right front wheel; and
a housing accommodating a differential gear located between the left and right first arms in a plan view,
wherein
each of the left and right first arms has a front rod having a proximal part coupled to the vehicle frame, and a rear rod having a proximal part coupled to the vehicle frame at a position farther rearward than the front rod,
each of the left and right first arms is rotatable about a rotation axis extending forward and obliquely toward a center in a left-right direction in a plan view and passing through the two proximal parts,
the vehicle frame has left and right first front coupling parts to which the proximal parts of the front rods of the left and right first arms are coupled respectively,
the left and right first front coupling parts comprise a rod protruding from the vehicle frame, and
a coupling member is attached to at least one of the rods of the left and right first front coupling parts to couple an end of the at least one rod part to another part.
5. The vehicle according to claim 4, wherein
the ends of the rods of the left and right first front coupling parts are coupled to each other by the coupling member.
6. A vehicle comprising:
a vehicle frame;
a left front wheel and a right front wheel;
a left first arm supporting the left front wheel and a right first arm supporting the right front wheel; and
a housing accommodating a differential gear located between the left and right first arms in a plan view,
wherein
each of the left and right first arms has a front rod having a proximal part coupled to the vehicle frame, and a rear rod having a proximal part coupled to the vehicle frame at a position farther rearward than the front rod,
each of the left and right first arms is rotatable about a rotation axis extending forward and obliquely toward a center in a left-right direction in a plan view and passing through the two proximal parts,
the vehicle frame has left and right first front coupling parts to which the proximal parts of the front rods of the left and right first arms are coupled respectively,
the rotation axis extends forward and obliquely upward in a side view of the vehicle,
an angle $\theta 1$ is greater than an angle $\theta 2$, and
$\theta 2$ is an angle in a side view of the vehicle between the rotation axis and a straight line along a front-rear direction.
7. A vehicle comprising:
a vehicle frame;

a left front wheel and a right front wheel;
a left first arm supporting the left front wheel and a right first arm supporting the right front wheel; and
a housing accommodating a differential gear located between the left and right first arms in a plan view,
wherein
each of the left and right first arms has a front rod having a proximal part coupled to the vehicle frame, and a rear rod having a proximal part coupled to the vehicle frame at a position farther rearward than the front rod,
each of the left and right first arms is rotatable about a rotation axis extending forward and obliquely toward a center in a left-right direction in a plan view and passing through the two proximal parts, and
the vehicle frame has left and right first front coupling parts to which the proximal parts of the front rods of the left and right first arms are coupled respectively,
the vehicle further comprising:
left and right second arms supporting the left and right front wheels respectively and located above or below the first arms,
wherein
each of the left and right second arms comprises a front rod having a proximal part coupled to the vehicle frame, and a rear rod having a proximal part coupled to the vehicle frame at a position farther rearward than the front rod, and
each of the left and right second arms is rotatable about a rotation axis extending forward and obliquely toward a center in a left-right direction in a plan view and passing through the proximal parts.

8. A vehicle comprising:
a vehicle frame;
a left front wheel and a right front wheel;
a left first arm supporting the left front wheel and a right first arm supporting the right front wheel; and
a housing accommodating a differential gear located between the left and right first arms in a plan view,
wherein
each of the left and right first arms has a front rod having a proximal part coupled to the vehicle frame, and a rear rod having a proximal part coupled to the vehicle frame at a position farther rearward than the front rod,
each of the left and right first arms is rotatable about a rotation axis extending forward and obliquely toward a center in a left-right direction in a plan view and passing through the two proximal parts,
the vehicle frame has left and right first front coupling parts to which the proximal parts of the front rods of the left and right first arms are coupled respectively, and
a distance between the left and right first front coupling parts is smaller than a width in a left-right direction of the housing of the differential gear,
the vehicle further comprising:
left and right second arms supporting the left and right front wheels respectively and located above or below the first arm,
wherein
each of the left and right second arms comprises a front rod having a proximal part coupled to the vehicle frame, and a rear rod having a proximal part coupled to the vehicle frame at a position farther rearward than the front rod,
each of the left and right second arms is rotatable about a rotation axis extending forward and obliquely toward a center in a left-right direction as viewed in a plan view and passing through the proximal parts,
the vehicle frame comprises left and right second front coupling parts to which the proximal parts of the front rods of the left and right second arms are connected respectively, and
a distance between the left and right second front coupling parts is smaller than the width in the left-right direction of the housing of the differential gear.

9. A vehicle comprising:
a vehicle frame;
a left front wheel and a right front wheel;
a left first arm supporting the left front wheel and a right first arm supporting the right front wheel; and
a housing accommodating a differential gear located between the left and right first arms in a plan view,
wherein
each of the left and right first arms has a front rod having a proximal part coupled to the vehicle frame, and a rear rod having a proximal part coupled to the vehicle frame at a position farther rearward than the front rod,
each of the left and right first arms is rotatable about a rotation axis extending forward and obliquely toward a center in a left-right direction in a plan view and passing through the two proximal parts,
the vehicle frame has left and right first front coupling parts to which the proximal parts of the front rods of the left and right first arms are coupled respectively,
a distance between the left and right first front coupling parts is smaller than a width in a left-right direction of the housing of the differential gear,
the vehicle frame comprises left and right first rear coupling parts to which the proximal parts of the rear rods of the left and right first arms are connected respectively,
a distance between the left and right first rear coupling parts is larger than the width in the left-right direction of the housing of the differential gear,
the left and right first front coupling parts are located to the front of the housing of the differential gear in a plan view, and
the left and right first rear coupling parts are located farther rearward than the housing of the differential gear in a plan view.

10. A vehicle comprising:
a vehicle frame;
a left front wheel and a right front wheel;
a left first arm supporting the left front wheel and a right first arm supporting the right front wheel;
a housing accommodating a differential gear located between the left and right first arms in a plan view;
a left joint part connecting the differential gear and a left shaft coupling to an axle of the left front wheel, and
a right joint part connecting the differential gear and a right shaft coupling to an axle of the right front wheel,
wherein
each of the left and right first arms has a front rod having a proximal part coupled to the vehicle frame, and a rear rod having a proximal part coupled to the vehicle frame at a position farther rearward than the front rod,
each of the left and right first arms is rotatable about a rotation axis extending forward and obliquely toward a center in a left-right direction in a plan view and passing through the two proximal parts,
the vehicle frame has left and right first front coupling parts to which the proximal parts of the front rods of the left and right first arms are coupled respectively, and a distance between the left and right first front coupling parts is smaller than a distance between the left and right joint parts.

* * * * *